(12) United States Patent
Tsutsumikoshi

(10) Patent No.: US 6,427,796 B1
(45) Date of Patent: *Aug. 6, 2002

(54) REAR WHEEL SUSPENSION SYSTEM OF MOTORCYCLE

(75) Inventor: Shinobu Tsutsumikoshi, Hamamatsu (JP)

(73) Assignee: Suzuki Kabushiki Kaisha, Hamamatsu (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/862,438

(22) Filed: May 23, 2001

(30) Foreign Application Priority Data

May 23, 2000 (JP) ........................ 2000-151965

(51) Int. Cl.[7] .......................... B62D 61/02; B62K 11/04
(52) U.S. Cl. ..................... 180/227; 180/226; 180/292
(58) Field of Search ................................. 180/227, 228, 180/219, 230, 291, 292, 226

(56) References Cited

U.S. PATENT DOCUMENTS

| 613,885 | A | * | 11/1898 | McDonald | |
|---|---|---|---|---|---|
| 4,662,469 | A | * | 5/1987 | Matsuda et al. | 180/219 |
| 4,662,471 | A | * | 5/1987 | Kondo et al. | 180/226 |
| 4,887,687 | A | * | 12/1989 | Asai et al. | 180/219 |
| 4,901,813 | A | * | 2/1990 | Kimura et al. | 180/230 |
| 4,964,483 | A | * | 10/1990 | Yokoyama et al. | 180/219 |
| 5,263,549 | A | * | 11/1993 | Dick | 180/226 |
| 5,406,154 | A | * | 4/1995 | Kawaguchi et al. | 310/67 R |
| 6,073,719 | A | * | 6/2000 | Ohmika et al. | 180/219 |
| 2001/0020555 | A1 | * | 9/2001 | Iwai et al. | 180/219 |
| 2001/0047901 | A1 | * | 12/2001 | Tsutsumikoshi | 180/219 |

FOREIGN PATENT DOCUMENTS

JP  5-178256  *  7/1993  ................ 180/219

* cited by examiner

*Primary Examiner*—Avraham Lerner
(74) *Attorney, Agent, or Firm*—Oblon, Spivak, McClelland, Maier & Neustadt, P.C.

(57) ABSTRACT

In a motorcycle in which an engine unit is mounted to a motorcycle body and a power transmission unit coupled to the engine unit is arranged to the motorcycle body to be swingable through a pivot shaft, a rear wheel suspension system is formed so as to include the power transmission unit, a pair of arm members disposed to lateral side portions of the motorcycle body in parallel to each other, and connection members connecting both end portions of the arm members. One of the arm members constitutes the power transmission unit which has an inner hollow portion in which a power transmission member is accommodated and has a structure dividable into lateral two parts forming an arm base section and a cover section.

4 Claims, 6 Drawing Sheets

REAR WHEEL SUSPENSION SYSTEM OF MOTORCYCLE

BACKGROUND OF THE INVENTION

The present invention relates to a rear wheel suspension system of a motorcycle.

Generally, there has been adopted a swing-arm system for suspending a rear wheel of a motorcycle, and in such swing-arm system, a lateral pair of arm members arranged in parallel to each other are coupled at one ends at which the arm members are pivoted to a motorcycle body. Further, an axle of the rear wheel is supported by free ends of the arm members.

Furthermore, in a shaft-drive system of the type in which rotation of an engine of the motorcycle is transmitted to the rearwheel through a propeller shaft, a power transmission (unit) including, for example, a propeller shaft is housed in one of the arm members. This arm member is formed to be dividable along the axial direction of the propeller shaft, i.e. longitudinal direction of the motorcycle body.

In such conventional arrangement mentioned above, it becomes difficult to assemble and maintain the power transmission unit. More particularly, in a case where parts or members are disposed in a deep portion of the arm member or exchanged at such deep portion, it is required for a worker to disassemble or once remove all other parts including such as power transmission unit, which results in a bad operating property of the motorcycle.

SUMMARY OF THE INVENTION

An object of the present invention is therefore to substantially eliminate defects or drawbacks encountered in the prior art mentioned above and to provide a rear wheel suspension system of a motorcycle providing an improved assembling performance and/or operating property.

This and other objects can be achieved according to the present invention by providing a rear wheel suspension system of a motorcycle in which an engine unit is mounted to a motorcycle body and a power transmission unit coupled to the engine unit is arranged to the motorcycle body to be swingable through a pivot shaft, the rear wheel suspension system comprising the power transmission unit, a pair of arm members disposed to lateral side portions of the motorcycle body in parallel to each other, and connection members connecting both end portions of the arm members, wherein one of the arm members constitutes the power transmission unit which has an inner hollow portion in which a power transmission member is accommodated and has a structure dividable into lateral two parts forming an arm base section and a cover section.

In a preferred example of the above aspect, the power transmission member is a propeller shaft, a bearing is formed in the cover section of the power transmission unit so as to support one end portion of the propeller shaft. One of the connection members connecting one endportions of the arm members constitutes a support member supporting the pivot shaft and wherein a swing motion center of a universal joint coupling the propeller shaft and a power output shaft of the engine unit is disposed on an extension of an axis of the pivot shaft.

At least other one of the arm members, the arm base section and connection members are formed through a casting process.

According to the present invention, swing-arm-type rear wheel suspension system includes the transmission unit composed of the arm base section and the arm cover section, so that the power transmission member disposed inside the transmission unit can be easily assembled and thus easily maintained and inspected.

Since the propeller shaft and the cover section is formed integrally to be detachable, the assembling performance and or operating property can be improved. The arrangement of the swing motion center of the universal joint on the extension of the pivot shaft axis makes it possible to smoothly transmit the driving force (speed) of the engine. The casting process can improve the rigidity and moldability of parts such as arm member, base section and connection member.

The nature and further characteristic features of the present invention will be made more clear from the following descriptions made with reference to the accompanying drawings.

DESCRIPTION OF THE PREFERRED EMBODIMENT

A preferred embodiment of a rear wheel suspension system of a motorcycle according to the present invention will be described hereunder with reference to the accompanying drawings.

Figure 1:
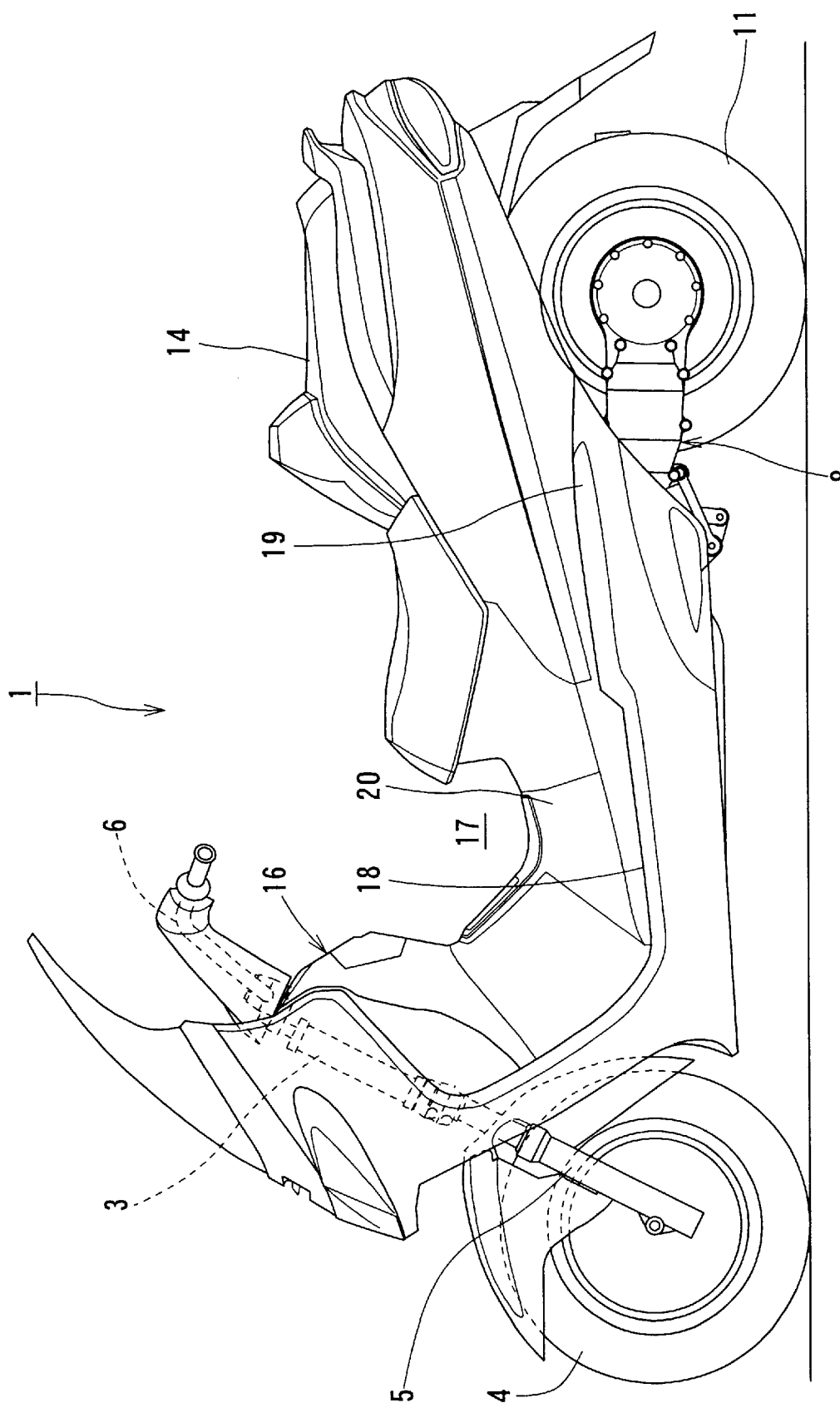
FIG. 1 is a left side view of a scooter-type motorcycle provided with a rear wheel suspension system according to one embodiment of the present invention.
Figure 2:
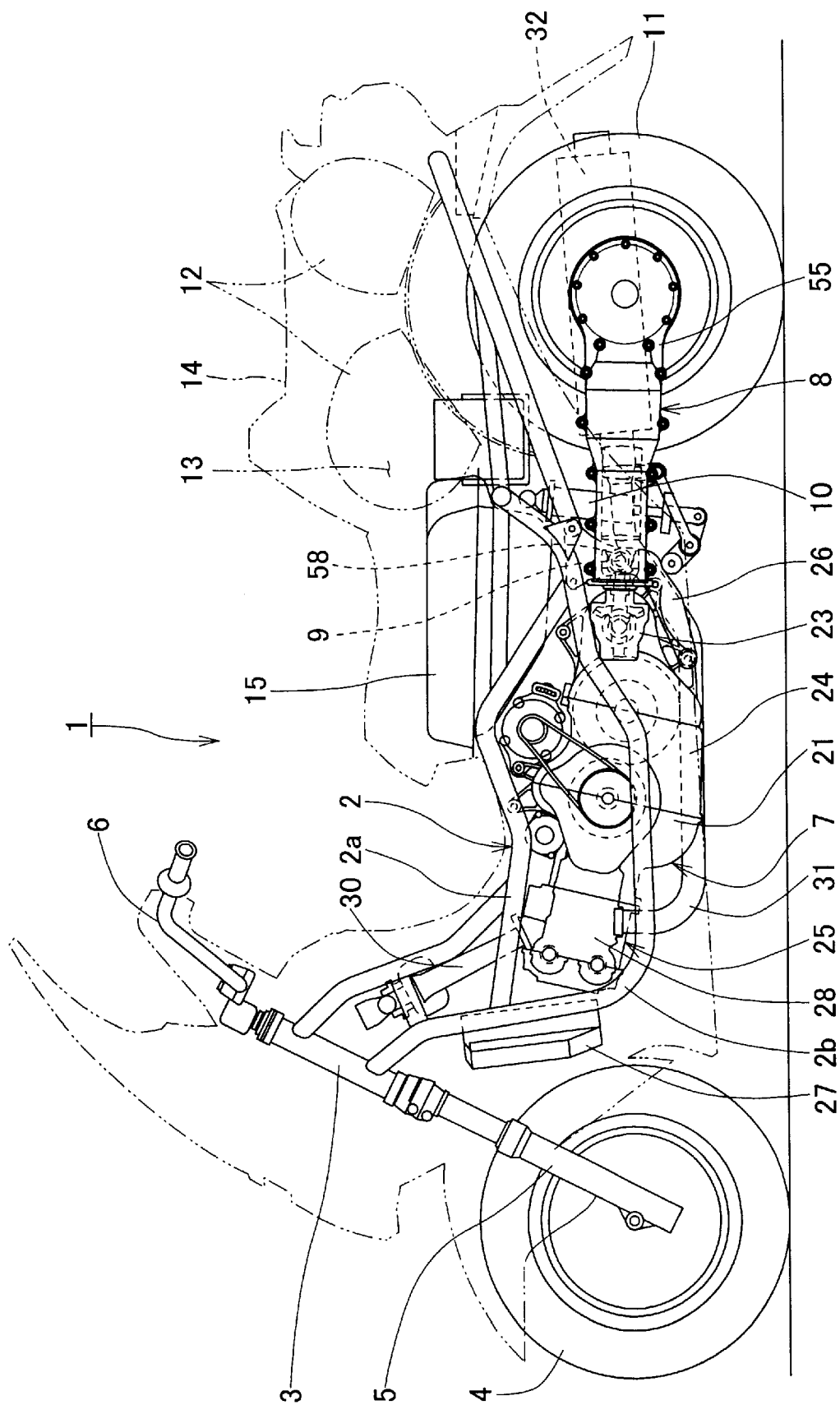
FIG. 2 is also a left side view of the scooter-type motorcycle of FIG. 1 for showing an inner arrangement of constitutional members, parts and like thereof.
Figure 3:
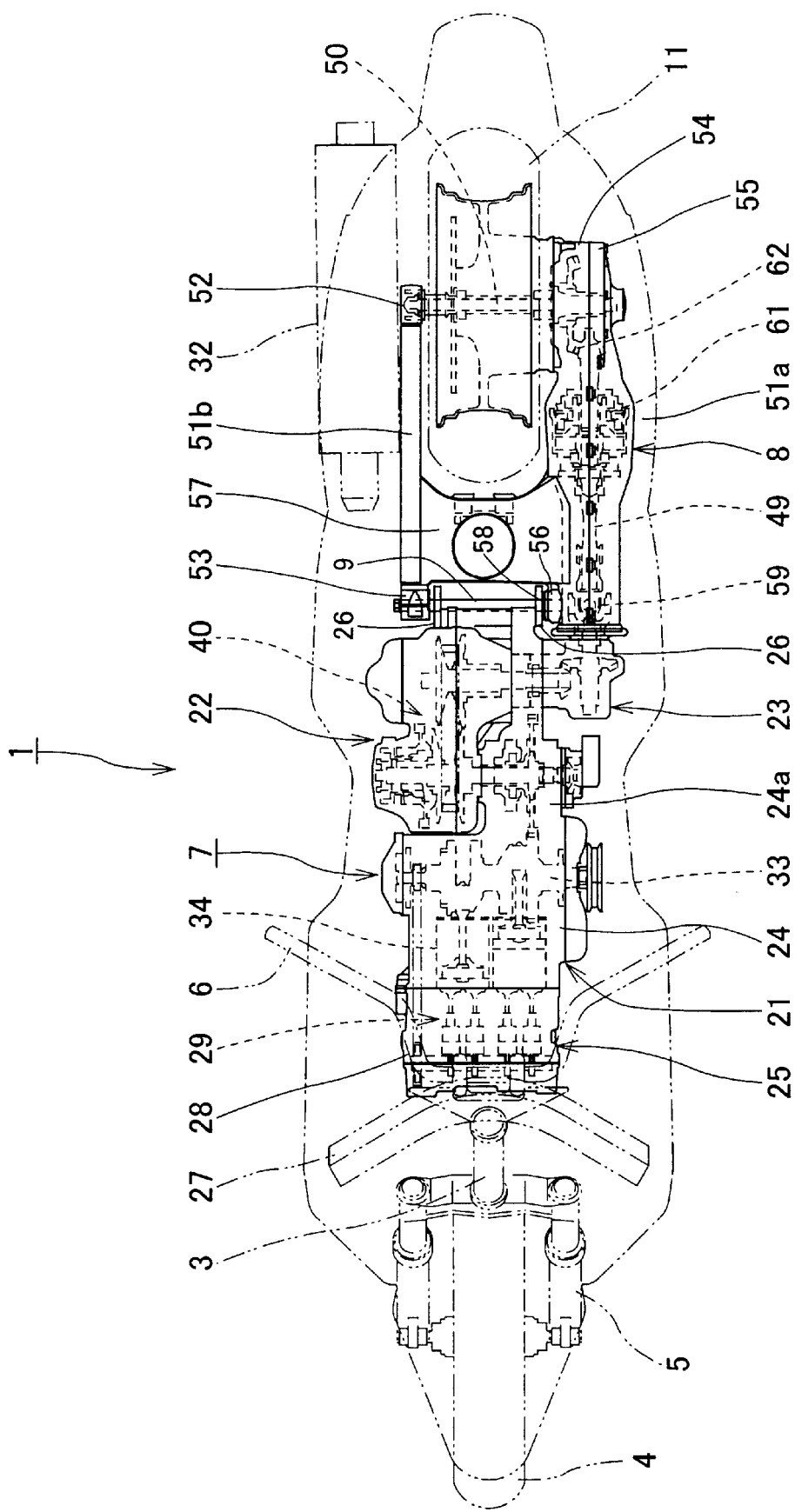
FIG. 3 is a plan view, as viewed from an upper side, of the motorcycle of FIG. 1 or 2 for showing an inner arrangement of constitutional members, parts and like thereof.

With reference to FIGS. 1, 2 and 3, a scooter-type motorcycle 1 has a body frame (structure) 2 having a front-end portion, longitudinally left side end as viewed, to which a head pipe 3 is mounted. The head pipe 3 is provided with a front fork 5 and a handle bar 6 for supporting and steering a front wheel 4 to be pivotal in the lateral direction of a motorcycle body as a vehicle body.

An engine unit 7 is mounted to a central lower portion of the body frame structure 2. A transmission unit 8 as a power transmission device is arranged to a rear portion of the engine unit 7, and a front side portion of the transmission unit 8 is pivoted to the body frame 2 through a later mentioned pivot shaft 9.

The transmission unit 8 is also operated (functions) as a swing-arm-type rear wheel suspension system 8 and supported to the body frame 2 through a shock absorber 10 elastically and swingably. A rear wheel 11, as a driving wheel, is supported to a rear-end portion of the transmission unit 8.

An article accommodation box (chamber) 13 for accommodating tools, not shown, and articles such as helmet 12 or like is formed above the rear wheel 11. Further, a rider's seat 14, which also acts as a lid for the accommodation box 13, is disposed above the accommodation box 13 to be opened or closed. Furthermore, a fuel tank 15 is arranged in a space between the lower front portion of the rider's seat 14 and the rear upper portion of the engine unit 7, and a body cover 16 formed as a synthetic resin product surrounds the body frame structure 2.

The body frame 2 and the body cover 16 have portions between the head pipe 3 and the rider's seat 14, these portions being bent downward in U-shape so as to provide a footing space 17 extending along the width direction of the motorcycle body and to form a pair of lateral foot rest floors 18 having low bottom floor surfaces, which are arranged between an upper frame 2a and a lower frame 2b of the body frame 2, on which rider's foot are rested. Other footrest floors 19 for a pillion rider are formed to rear portions of the footrest floors 18. Furthermore, a portion 20 in shape of tunnel is formed to a central portion of the foot rest floors 18 so as to extend in the longitudinal direction of the motorcycle body and to project upward.

Figure 4:
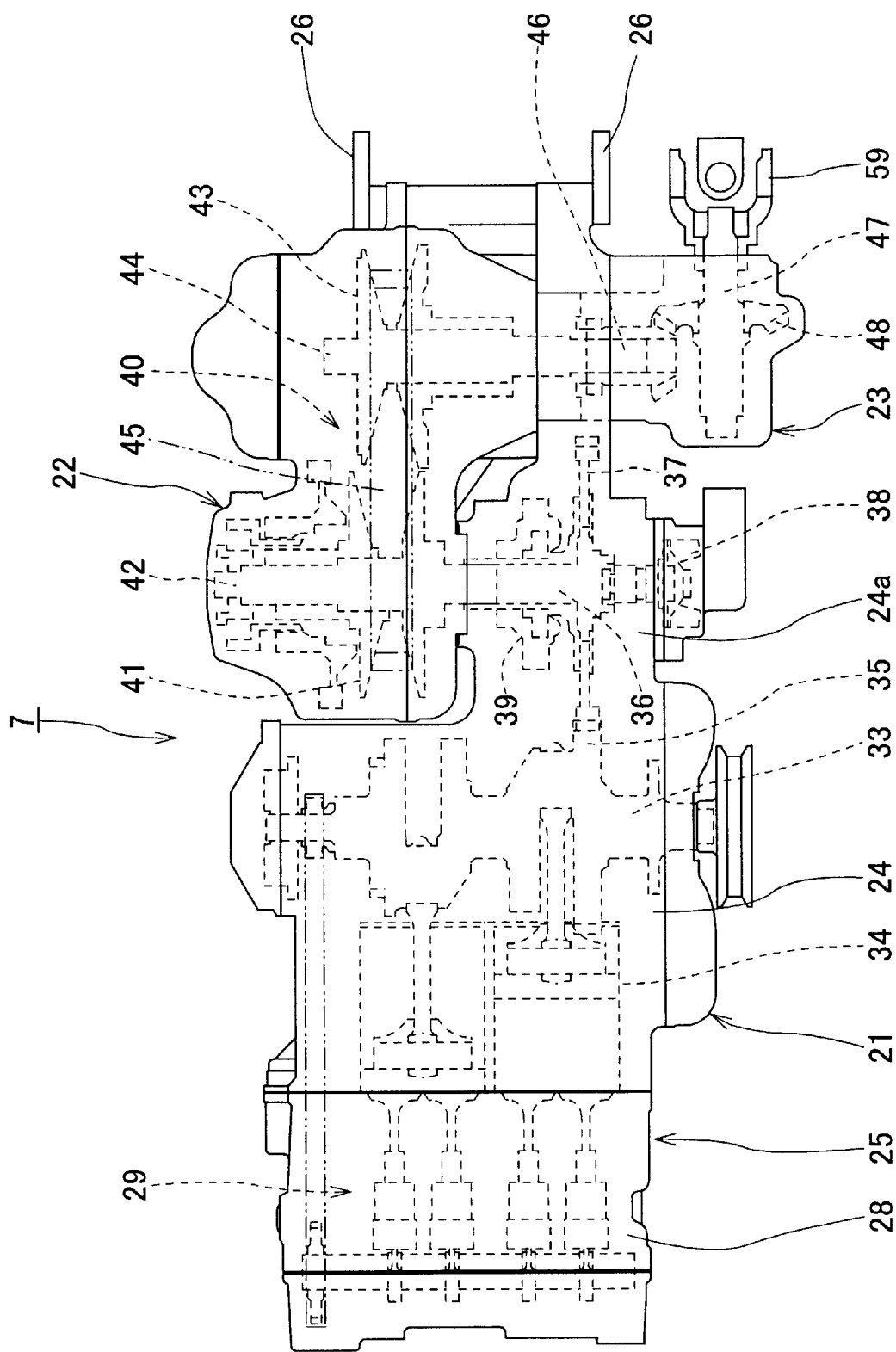
FIG. 4 is a plan view of an engine of the motorcycle in an enlarged scale.

With reference to FIGS. 2 to 4, the engine unit is sectioned into three portions of an engine body 21 as the power generating section, a transmission section 22 as a first speed changing section and a power transmission direction changing section 23 as a second speed changing section. The engine body 21 is mainly composed of a crankcase 24 and a cylinder assembly 25 mounted substantially horizontally to the front portion of the crankcase 24. The engine body 21 is mounted to the body frame 2 through brackets 26 or like.

The engine body 21 mounted to the motorcycle 1 of this embodiment is of a water-cooled type structure, in which a radiator 27 that cools a coolant for cooling the engine body 21 is arranged in the body cover 16 between the front wheel 4 and the engine body 21.

A valve operating mechanism 29 is disposed in the cylinder head 28 mounted to a front portion of the cylinder assembly 25. Further, an intake tube 30 is connected to an upper portion of the cylinder head 28.

On the other hand, an exhaust tube 31 is connected, at its base end portion, to a bottom portion of the cylinder head 28. The exhaust tube 31 is guided below the engine unit 7 and then extends rearward, and a muffler 32 is connected to the downstream end of the exhaust tube 31. Further, the muffler 32, in this embodiment, is disposed in a manner offset to the right side from the center of the motorcycle body in the motorcycle advancing direction.

The engine body 21 of this embodiment is so-called a parallel two-cylinder engine in which two cylinders 34 provided with a common crankshaft 33 extending in the width direction of the motorcycle body in the crank case 24 are arranged side by side in parallel.

A primary drive gear 35 is arranged to one end portion, left side end in this embodiment, of the crankshaft 35.

The crank case 24 has an extending portion (extension) 24a extending rearward so as to provide approximately an L-shape in a plane view, the extension 24a is disposed behind the primary drive gear 35, and a first coupling shaft 36 is arranged in parallel to the crankshaft 33 in the extension 24a. The first coupling shaft 36 is provided with a primary driven gear 37 which comprises primary reduction mechanism, which is operatively coupled with the primary drive gear 35 provided for the crankshaft 33 to thereby transmit the rotation of the crankshaft 33 to the first coupling shaft 36.

A water pump 38 for circulating the coolant is connected to one end portion, left side end in this embodiment, of the first coupling shaft 36, while an oil pump 39 for pressure feeding lubricant is arranged coaxially on the other end portion, right side end in this embodiment, of the first coupling shaft 36.

The transmission section 22 is arranged at a rear side portion of the crankcase 24, in which a V-belt type automatic transmission device (speed-change gear) 40 is arranged. The automatic transmission device 40 is equipped with a drive shaft 42 having a drive pulley 41 and a driven shaft 44 having a driven pulley 43. The drive shaft 42 is arranged behind the crankcase 33 and coaxially with the first coupling shaft 36 at a position opposing to the first coupling shaft 36 in the width direction of the motorcycle body. Further, a driven shaft 44 is arranged behind the drive shaft 42 in parallel thereto.

The drive shaft 42 has one end opposing to the first coupling shaft 36, left side end in this embodiment, is connected to the first coupling shaft 36 through, for example, a spline coupling fashion. A V-belt 45 is stretched around the drive pulley 41 and the driven pulley 43, and the rotation driving force of the engine body 21 is transmitted to the driven pulley 43 through the V-belt 45.

The transmission section 22 has an approximately L-shape as like as the crankcase 24 in its plane view and is arranged such that inside surfaces of both the L-shape portions of the crankcase 24 and the transmission section 22 face each other.

The power transmission direction changing section 23 is arranged at the rear side of the extension 24a of the crankcase 24, in which a second coupling shaft 46 is disposed. The second coupling shaft 46 is arranged coaxially with the driven shaft 44 at the position opposed thereto in the width direction of the motorcycle body, and both the shafts 56 and 66 are connected together, for example, through the spline coupling, so that the rotation driving force of the engine body 21 reduced in speed by the transmission device 40 is transmitted to the second coupling shaft 46.

Further, a transmission shaft 47, which is a last-stage power output shaft of the engine unit 7, is arranged in the power transmission direction changing section 23 to be normal to the second coupling shaft 46. Accordingly, the rotational direction of the second coupling shaft 46 is transformed by 90 degrees through a bevel gear 48 and transmitted to the transmission shaft 47.

Furthermore, the rotation driving force transmitted to the transmission shaft 47 from the engine body 21 is transmitted to an axle shaft 50 of the rear wheel 11 through a propeller shaft 49, which is housed in the transmission unit 8.

Figure 5:
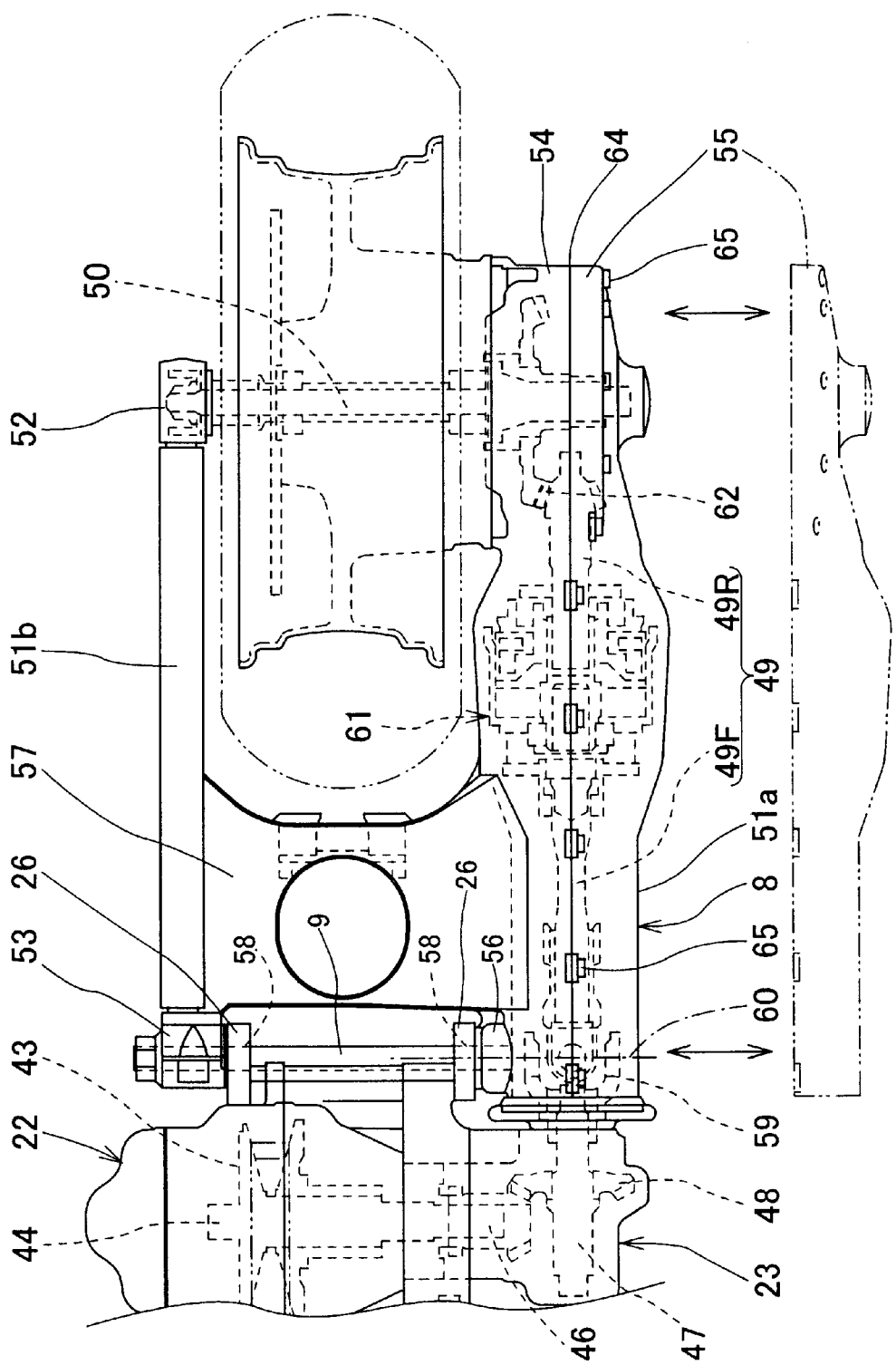
FIG. 5 is a plan view of the rear wheel suspension system in an enlarged scale.
Figure 6:
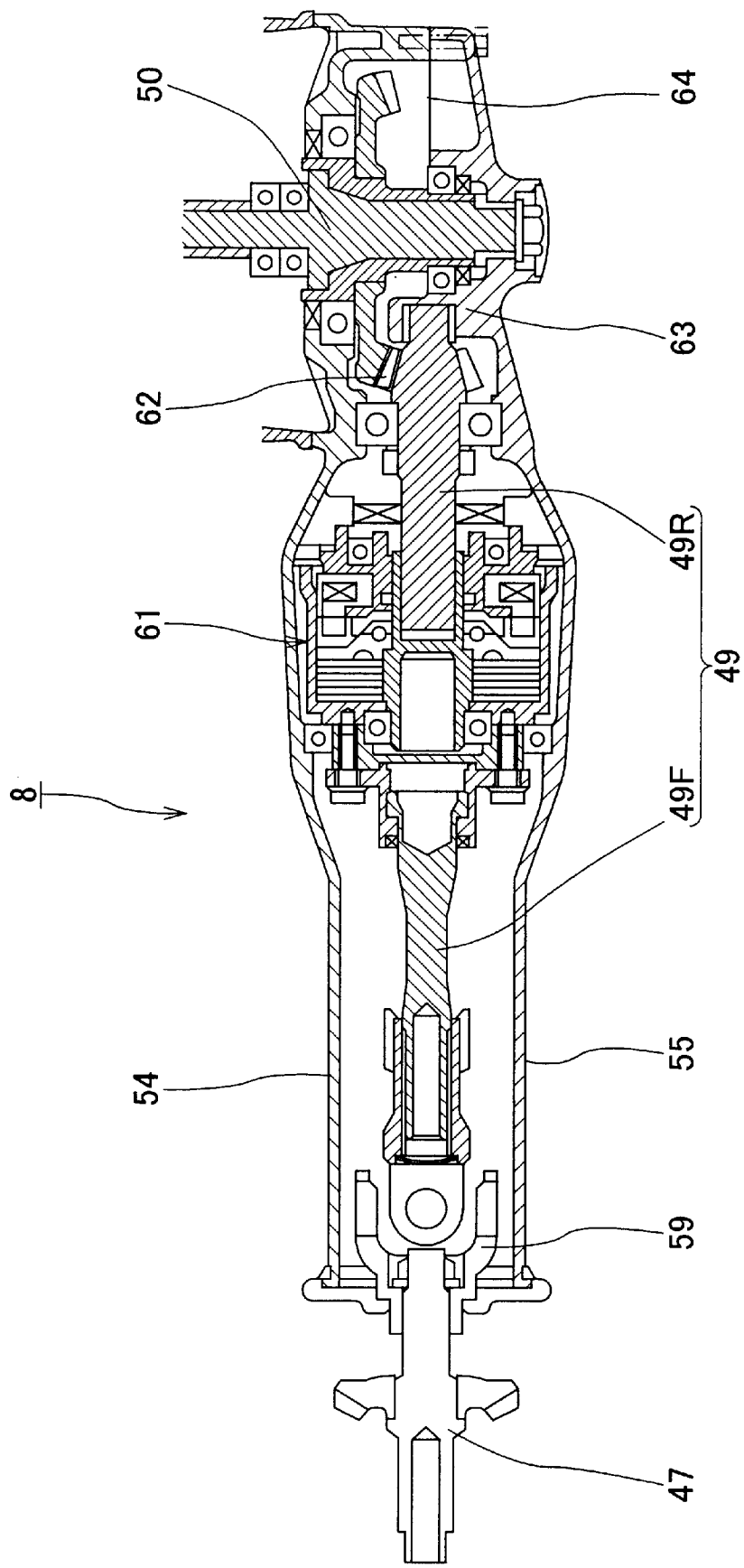
FIG. 6 is a horizontal sectional view of a transmission unit of the motorcycle.

The transmission unit 8 is operated (functions) as the swing-arm-type rear wheel suspension system, as mentioned above. With reference to FIGS. 5 and 6, a pair of lateral arm portions 51a and 51b, one 51a of which acts as the rear wheel suspension system as mentioned hereinlater. The other one 51b of the arm portions, arranged in the right side of the motorcycle body in the motorcycle advancing direction in this embodiment, has a simple stick form. A supporting member 52 of the axle shaft 50 is disposed at the rear-end portion of the arm portion 51, while a supporting member 53 of the pivot shaft 9 is disposed at the front-end portion of the arm portion 51.

On the other hand, the one of the arm portions 51a, arranged in the left side of the motorcycle body in the motorcycle advancing direction in this embodiment, acts as the transmission unit. The arm portion 51a is formed in a hollow form so that the power transmission members, such as the propeller shaft 49, are housed therein. Further, the arm portion 51a is formed dividable in side ways, left and right, comprising an arm base portion 54 being arranged inside, and a cover portion 55 being arranged outside.

A supporting member 56 of the pivot shaft 9 is disposed at the inside of the front-end portion of the arm base portion 54. Further, the arm base portion 54 and the right side arm portion 51b are connected through a connecting member 57 behind the supporting members 53 and 56. Furthermore, the supporting members 53 and 56 are pivoted through the pivot shaft 9 to the pivot portion 58 disposed on the brackets 26 which fix the rear portion of the engine unit 7 to the body frame 2. Moreover, of the rear wheel suspension system 8, at least one of the right side arm portion 51b, the arm base portion 54 or the connecting member 57 is molded by casting.

The propeller shaft 49 housed in the transmission unit 8 is divided into a front shaft portion 49F and a rear shaft portion 49R. The front shaft portion 49F and the transmission shaft 47 housed in the power transmission direction changing section 23 are coupled by means of a universal joint 59. Further, a swing motion center of the universal joint 59 is arranged on the extension of an axis (centerline) 60 of the pivot shaft 9. Furthermore, the rotation driving force of the engine body 21 is transmitted to the propeller shaft 49 through the universal joint 59.

On the other hand, a starter mechanism 61, which is one of the power-transmission members, is connected to the coupling portion between the front and rear shaft portions 49F and 49R of the propeller shaft 49 in the transmission unit 8. This starter clutch mechanism 61 is, for example, composed of an electromagnetically controllable wet-type multi-plate clutch.

The electromagnetically controllable wet-type multi-plate clutch mechanism 61 mentioned herein comprises, though not shown in detail, a pilot clutch which is electrically intermittently controllable and has a small transmission torque, and a main clutch which can transmit a torque larger than that of the pilot clutch, a rotational phase difference is caused between the pilot clutch and the main clutch. This rotational phase difference is converted into a pressing force of a pressure plate of the main clutch by a cam mechanism provided for the pilot clutch and then amplified to thereby make it possible to transmit the large torque.

Since it is possible to make the electromagnetically controllable pilot clutch compact, the response of the clutch will be improved as well as reducing the size of the main clutch. Moreover, reducing the size of the entire structure of the transmission unit 8 may be possible. Further, a centrifugal-type clutch mechanism may be utilized in place of the electromagnetically controllable wet-type multi-plate clutch mechanism 61 of the structure mentioned above.

Furthermore, the axle shaft 50, which is the power transmission member, is supported to be rotatable at a portion near the rear end of the rear shaft portion 49R, and the rotational direction of the propeller shaft 49 is changed by 90 degrees through a bevel gear 62, which is the one of power transmitting devices as well as a last-stage reduction mechanism, and the rotation is then transmitted to the axle shaft 50. Further, as shown in FIG. 6, the rear end portion of the rear shaft portion 49R is rotatably supported by a bearing portion 63, which is disposed inside the cover portion 55 of the transmission unit 8.

Finally, mating faces 64 of the transmission unit 8, which is to be divided into the arm base portion 54 and the cover portion 55 in side ways, extend in the longitudinal direction of the transmission unit 8 and are arranged parallel to the propeller shaft 49. Further, the mating faces 64 are arranged in substantially vertical manner so as to pass through the axis of the propeller shaft 49. Furthermore, the cover portion 55 is fastened to the arm base portion 54 by means of bolts 65.

The embodiment of the present invention of the structure mentioned above will function or operate as follows.

According to the present invention, by utilizing the one of the arm portions 51a of the swing-arm-type rear wheel suspension system as the transmission unit in which the universal joint 59, the propeller shaft 49, the starter clutch mechanism 61, the bevel gear 62 which is the final reduction mechanism, and the axle shaft 50 of the rear wheel 11 are housed and forming the transmission unit 8 dividable in side ways composing the arm base portion 54 and the cover portion 55, the assembling and the maintenance of the power transmission members become easier. Especially, when one prefers to maintain only certain part of the devices, rest of the parts are not needed to be removed, and therefore the maintenance ability would be improved.

Further, by disposing the bearing portion inside the cover portion 55 of the transmission unit 8 for supporting the rear end portion of the propeller shaft 49, abilities of assembling and the maintenance would be improved because the propeller shaft 49 may be attached or detached as a unit with the cover portion 55.

Furthermore, by disposing the supporting members 53 and 56 of the pivot shaft 9 at the front-end portions of the arm portions 51a and 51b, while arranging the swinging center of the universal joint 59, which couples the propeller shaft 49 and the transmission shaft 47 of the power transmission direction transforming section 23, on the extended centerline 60 of the pivot shaft 9, the transmission unit 8 and the propeller shaft 49 are swung vertically around the pivot portion 58 coaxially so that the rotation driving force of the engine body 21 is transmitted smoothly to the propeller shaft 49 and the axle shaft 50.

Finally, since rear wheel suspension system 8 has a complicated structure and required a high strength, having at least one of the right side arm portion 51, the arm base portion 54 or the connecting member 57 being molded through a casting process, the high rigidity can be obtained and the improved moldability can be achieved.

Further, it is to be noted that the present invention is not limited to the described embodiment and many other changes and modifications may be made without departing from the scopes of the appended claims.

What is claimed is:

1. A rear wheel suspension system of a motorcycle in which an engine unit is mounted to a motorcycle body and a power transmission unit coupled to the engine unit is arranged to the motorcycle body to be swingable through a pivot shaft, said rear wheel suspension system, comprising the power transmission unit, a pair of arm members disposed to lateral side portions of the motorcycle body in parallel to each other, and connection members connecting both end portions of the arm members at portions behind the pivot shaft, wherein one of said arm members constitutes the power transmission unit including a propeller shaft, a bearing for the propeller shaft and a reduction mechanism, said transmission unit having inner hollow portion in which the propeller shaft is accommodated and having a structure dividable into lateral two parts forming an arm base section and a cover section, and said bearing is formed in the cover section of the power transmission unit so as to support one end portion of the propeller shaft.

2. A rear wheel suspension system according to claim 1, wherein one of said connection members connecting one end portions of the arm members constitutes a support member supporting the pivot shaft and wherein a swing motion center of a universal joint coupling the propeller shaft and a power output shaft of the engine unit is disposed on an extension of an axis of the pivot shaft.

3. A rear wheel suspension system according to claim 1, wherein at least other one of said arm members, the arm base section and connection members are formed through a casting process.

4. A rear wheel suspension system of a motorcycle in which an engine unit is mounted to, a motorcycle body and a power transmission unit coupled to the engine unit is arranged to the motorcycle body to be swingable through a pivot shaft, said rear wheel suspension system comprising:

the power transmission unit including a propeller shaft, a bearing for the propeller shaft and the reduction mechanism, said transmission unit having inner hollow portion in which the propeller shaft is accommodated;

a pair of arm members disposed to lateral side portions of the motorcycle body in parallel to each other, one of said arm members constituting said power transmission unit; and connection members connecting both end portions of the arm members at portions behind the pivot shaft, said power transmission unit having a structure dividable into lateral two parts forming an arm base section and a cover section, so that a mating surface of the divided two parts are arranged in substantially vertical manner so as to pass through an axis of the propeller shaft, and said bearing being formed in the cover section of the power transmission unit so as to support one end portion of the propeller shaft.

* * * * *